United States Patent [19]

Munter

[11] Patent Number: 5,216,420

[45] Date of Patent: Jun. 1, 1993

[54] MATRIX SORTING NETWORK FOR SORTING N INPUTS ONTO N OUTPUTS

[76] Inventor: Ernst A. Munter, 4 Nanook Crescent, Kanata, Canada, K2L 2A7

[21] Appl. No.: 552,320

[22] Filed: Jul. 12, 1990

[51] Int. Cl.⁵ .............................................. H04Q 1/00
[52] U.S. Cl. ............................ 340/825.79; 340/825.8
[58] Field of Search .......... 340/825.79, 825.8, 825.87, 340/825.89, 826, 825.02, 825.9; 370/60, 94.1, 94.3, 112, 58.1

[56] References Cited

U.S. PATENT DOCUMENTS

| | | | |
|---|---|---|---|
| 3,593,295 | 7/1971 | Joel, Jr. ............................. | 340/825.8 |
| 4,654,842 | 3/1987 | Coraluppi et al. ................ | 340/825.8 |
| 4,833,468 | 5/1989 | Larson et al. ..................... | 370/58.1 |
| 4,899,334 | 2/1990 | Shimuzu ............................. | 370/60 |
| 4,922,246 | 5/1990 | Cormen et al. .................. | 340/825.79 |
| 4,955,015 | 9/1990 | Lobjiinski et al. ................ | 370/94.3 |

Primary Examiner—Donald J. Yusko
Assistant Examiner—Edwin C. Holloway, III
Attorney, Agent, or Firm—Lerner, David, Littenberg, Krumholz & Mentlik

[57] ABSTRACT

In a switching system, or the like, an apparatus for sorting N signals has $\log_2 N$ stages of sorting matrices wherein each stage comprises M (N/2M)-by-(N/2M) matrices of sorting cells and the final stage (M=1) comprises an N/2-by-N/2 matrix of sorting cells. In practice, the matrices are almost square (N/2M)-by-([N/2M]+1).

7 Claims, 5 Drawing Sheets

MATRIX SORTING NETWORK FOR SORTING N INPUTS ONTO N OUTPUTS

CROSS-REFERENCE TO RELATED APPLICATION

This application is related to commonly assigned U.S. patent application 07/399,925 filed on Aug. 29, 1989 by E. A. Munter and I. Perryman, which is incorporated herein by reference.

BACKGROUND OF THE INVENTION

1. Field of the Invention

This invention relates to data processing systems in general, and to packet switching systems in particular. More particularly, this invention relates to sorting networks for use in, for example, asynchronus transfer mode (ATM) switch controllers or computer coprocessors.

2. Prior Art of the Invention

In ATM packet switching networks internal buffering is often used to resolve output contention, such as in a buffered Banyan network. An alternative to buffering is the use of sorting networks, the most well-known of which is the Batcher bitonic sorter as implemented, for example, in Batcher-Banyan networks.

In general, in communication systems and computer systems it may often be either necessary or desirable to sort signals received by the system. The sorting results in the system distinguishing, for example, signals of higher priority from signals of lower priority. The priority of a signal may be established on the basis, for example, of the magnitude of a particular constituent of it.

Prior art sorters have comprised sets of sub-stages of sorter cells forming sorting modules which increase in size, by a factor of two per stage. Such prior art sorters perform a binary merge operation on pairs of sorted lists. The connection patterns between stages and sub-stages in such prior art sorters are highly regular but are best implemented in a 3-dimensional way, since projections onto a plane requires a large amount of space for such sorters. Such sorters require three or four interconnection layers to accommodate the crossing signals and clock/power. Because of such interconnection topology it is not possible to remove a fractional part of the Batcher sorter.

SUMMARY OF THE INVENTION

It has been found that better performance and greater flexibility may be obtained using sorting networks comprising identical simple sorting cells in a compound matrix arrangement. Specifically, for N inputs already sorted by row and column a sorting matrix of N/2 rows of cells and N/2 columns of cells may be used to generate N sorted outputs on its diagonals by merging the two input sets. The presorted input sets can be the outputs of two smaller matrices of the same kind, down to the level of single inputs.

Accordingly, the present invention provides an apparatus for sorting N signals, comprising ($\log_2 N$) stages of sorting matrices wherein each stage comprises M (N/2M)-by-(N/2M) matrices of sorting, M being equal to N/2, N/4, N/8, ..., N/N.

In a preferred implementation of such apparatus, the sorting matrices are almost square comprising (N/2M)-by-([N/2M]+1) sorting matrices.

An advantage of the above described apparatus is that fractional slices of network along either edge between a set of inputs and the corresponding outputs may be removed without affecting the operation of the remaining network. This may facilitate testing and fault diagnosis in that the size of the fully configured network can be dynamically reduced.

A disadvantage of the matrix sorting apparatus of the present invention is that its size grows faster than that of the Batcher bitonic sorter with increasing N; (size growing as the square of N as opposed to the square of ($\log_2 N$) for the Batcher sorter). However, over a certain size range, the matrix sorter of the present invention is much faster. For small N, say around 16 or 32, the hardware requirements of both types of sorters are comparable, but the matrix sorter is significantly faster.

BRIEF DESCRIPTION OF THE DRAWINGS

The preferred embodiment of the present invention will now be described in detail in conjunction with the annexed drawings, in which.

DETAILED DESCRIPTION OF THE PREFERRED EMBODIMENT

Figure 1:
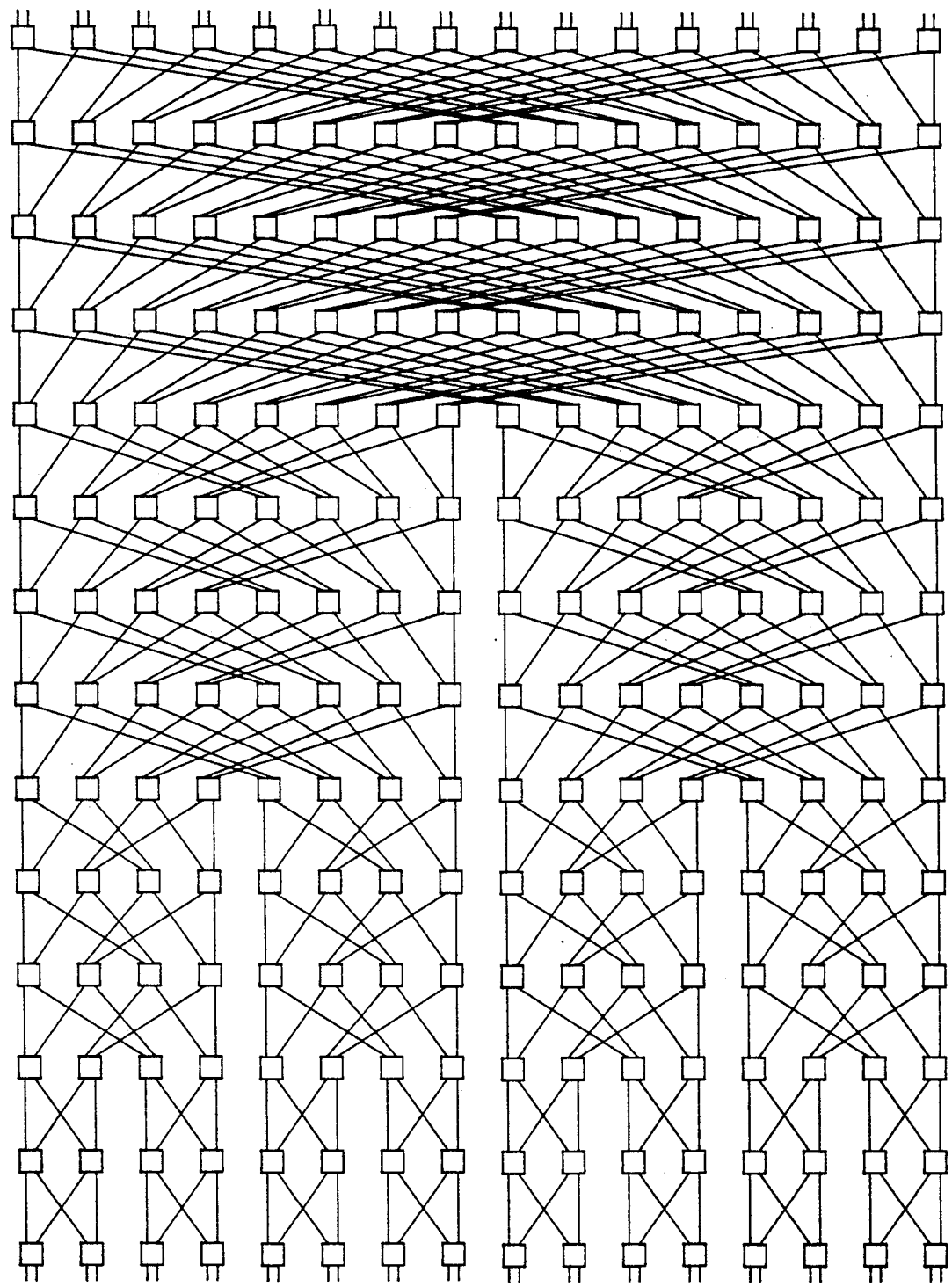
FIG. 1 illustrates schematically a prior art 32-port batcher sorting network.

FIG. 1 of the drawings shows a prior art 32-port batcher sorting network, whose cells operate essentially as double-pole-double-throw switches with two input and two output ports. The 240 cells, interconnected as shown in the figure, may be used to sort 32 input signals into 32 output signals. While it has fewer and simpler cells than does the matrix sorter of the present invention, it exhibits complex interconnection topology, particularly toward the output, and is less flexible.

Figure 2:
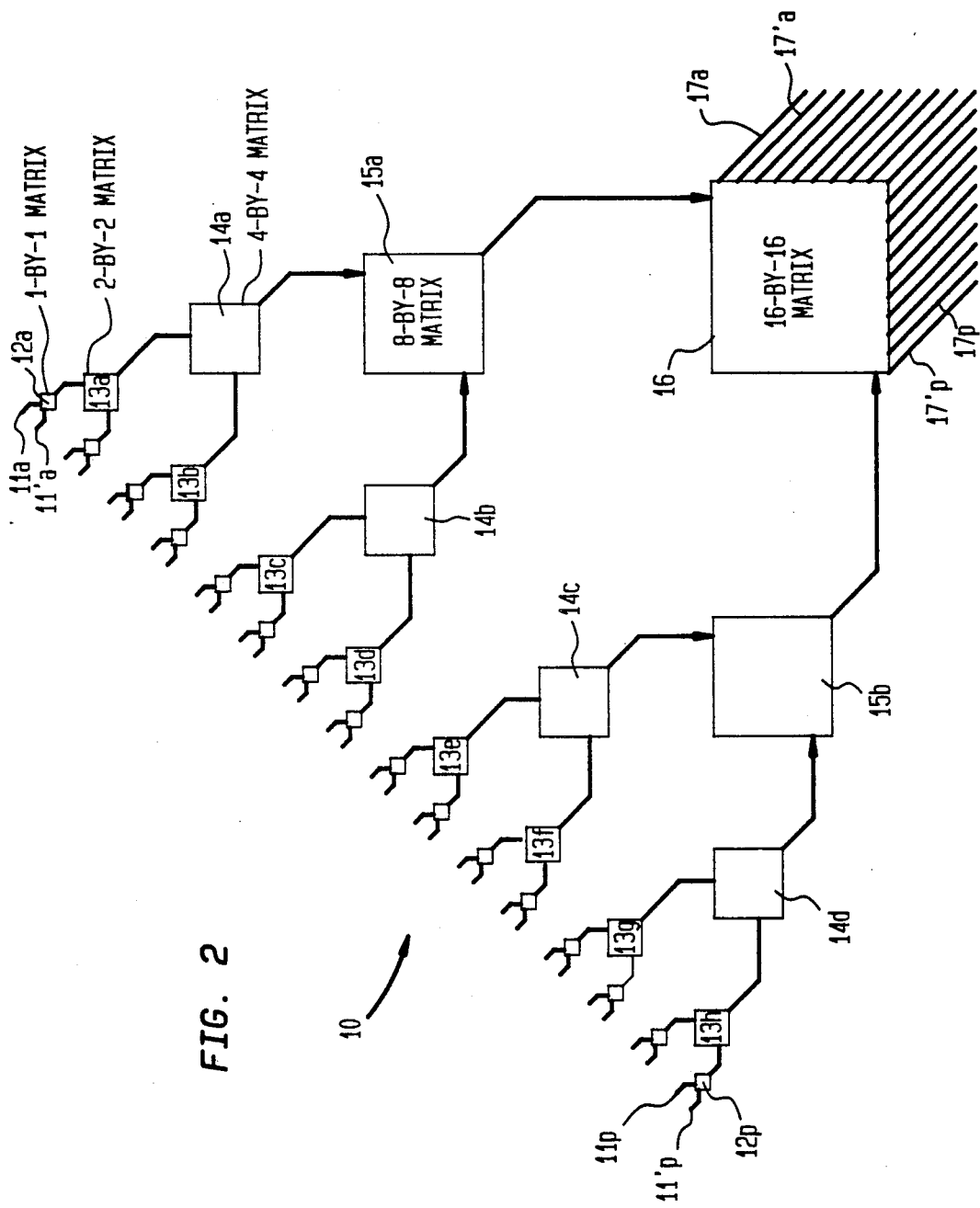
FIG. 2 illustrates schematically a 32-port matrix sorting network according to the present invention.

Referring now to FIG. 2 of the drawings, a sorting network 10 for sorting 32 input signals (applied at inputs 11a and 11'a to 11p and 11'p) according to the present invention comprises five ($\log_2 32$) stages of sorting matrices. The matrices 12a to 12p, 13a to 13h, 14a to 14d, 15a to 15b, and 16, wherein the diagonal outputs are row/column inputs to the succeeding matrix. The 32 diagonal outputs of the final matrix 16 (17a and 17'a to 17p and 17'p) represent the outputs of the entire network 10.

Figure 3:
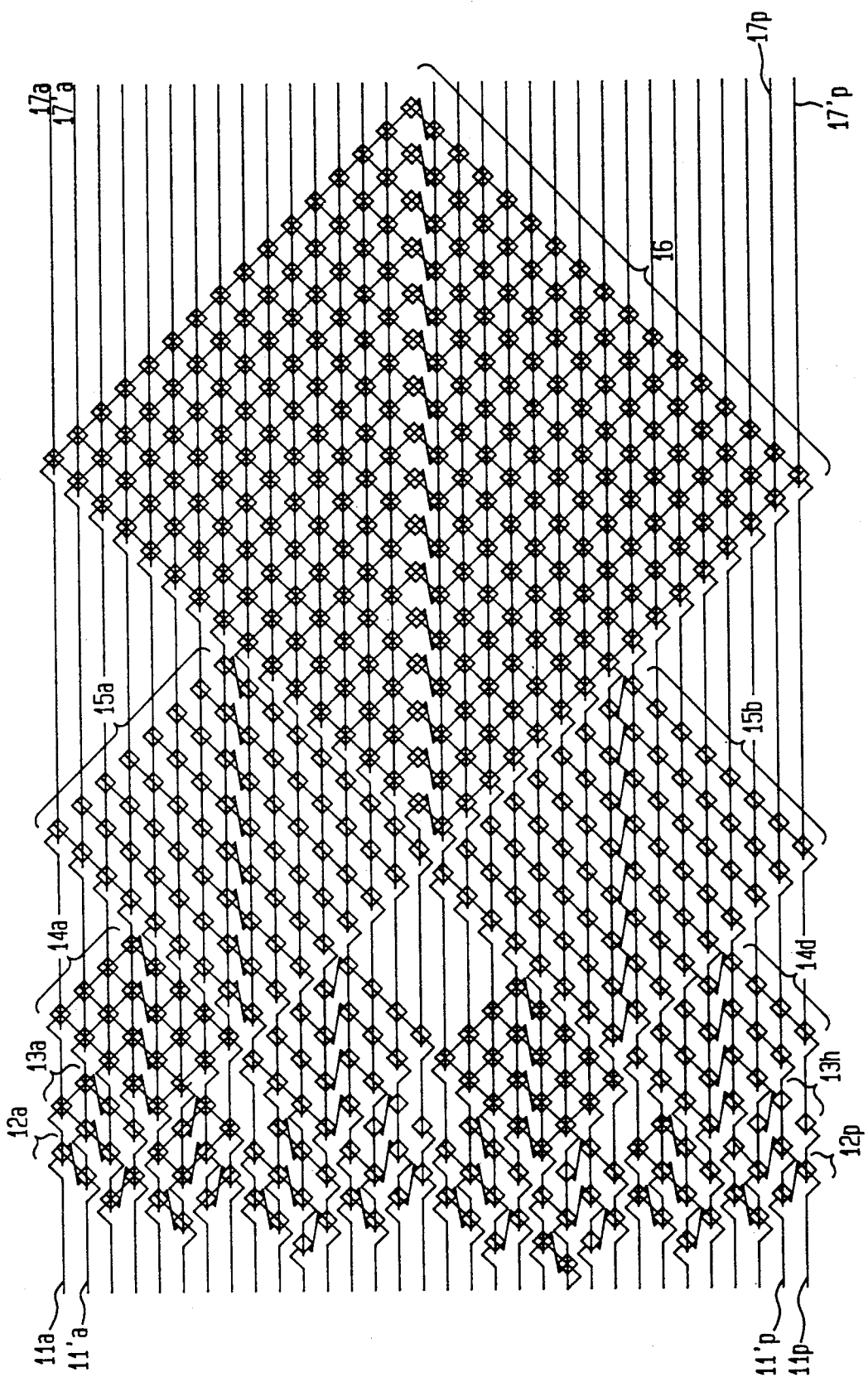
FIG. 3 illustrates schematically in more detail the 32-port matrix sorting network shown in FIG. 2.

In FIG. 3, which corresponds substantially to FIG. 2 but shows details of interconnection, each of the matrices 12a–12p, 13a–13h, 14a–14d, 15a–15b, and 16 are not square matrices, but are, respectively, 1-by-2, 2-by-3, 4-by-5, 8-by-9, and 16-by-17. The reason for this practical difference from the theoretical square matrices is that it is necessary to split the main diagonal of each matrix into two diagonals in order not to have special cells along the main diagonal of a matrix.

Figure 4:
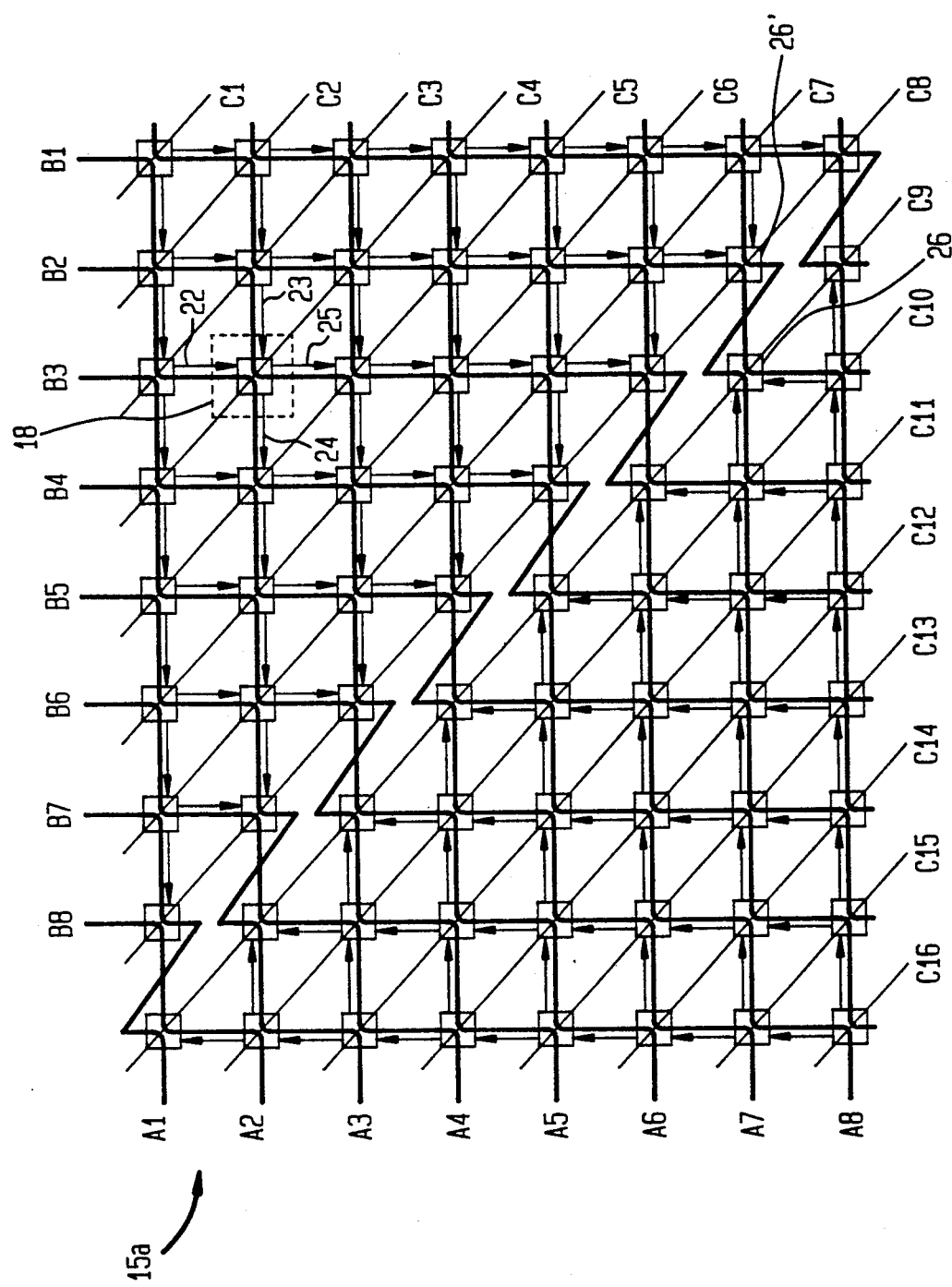
FIG. 4 illustrates the 8-by-9 matrix shown in FIG. 3 in more detail.

For purposes of explanation, the matrix 15a is shown in more detail in FIG. 4. It comprises 8 rows and 9 columns of cells, one of which, designated 18 in FIG. 4, is shown in detail in FIG. 5. The matrix 15a comprises horizontal bus inputs A1 to A8 and vertical bus inputs B1 to B8. Diagonal buses C1 to C16 are the output buses which are applied to the matrix 16 as inputs.

In order to generate 16 diagonal outputs, the main diagonal C8 of the matrix is split into diagonals C8 and C9 by adding another column of cells, so that the 16 inputs sorted by row and column are output, completely sorted by the 8-by-9 matrix, onto the sixteen diagonal outputs C1 to C16. Alternatively, "specialized" cells (not shown) along the main diagonal C8 of the matrix 15a may be constructed so as to be able to achieve that result. Although, in the N/2-by-((N/2)+1) configuration, slightly more cells are used than in the N/2-by-N/2 configuration, all the cells are exactly alike.

Figure 5:
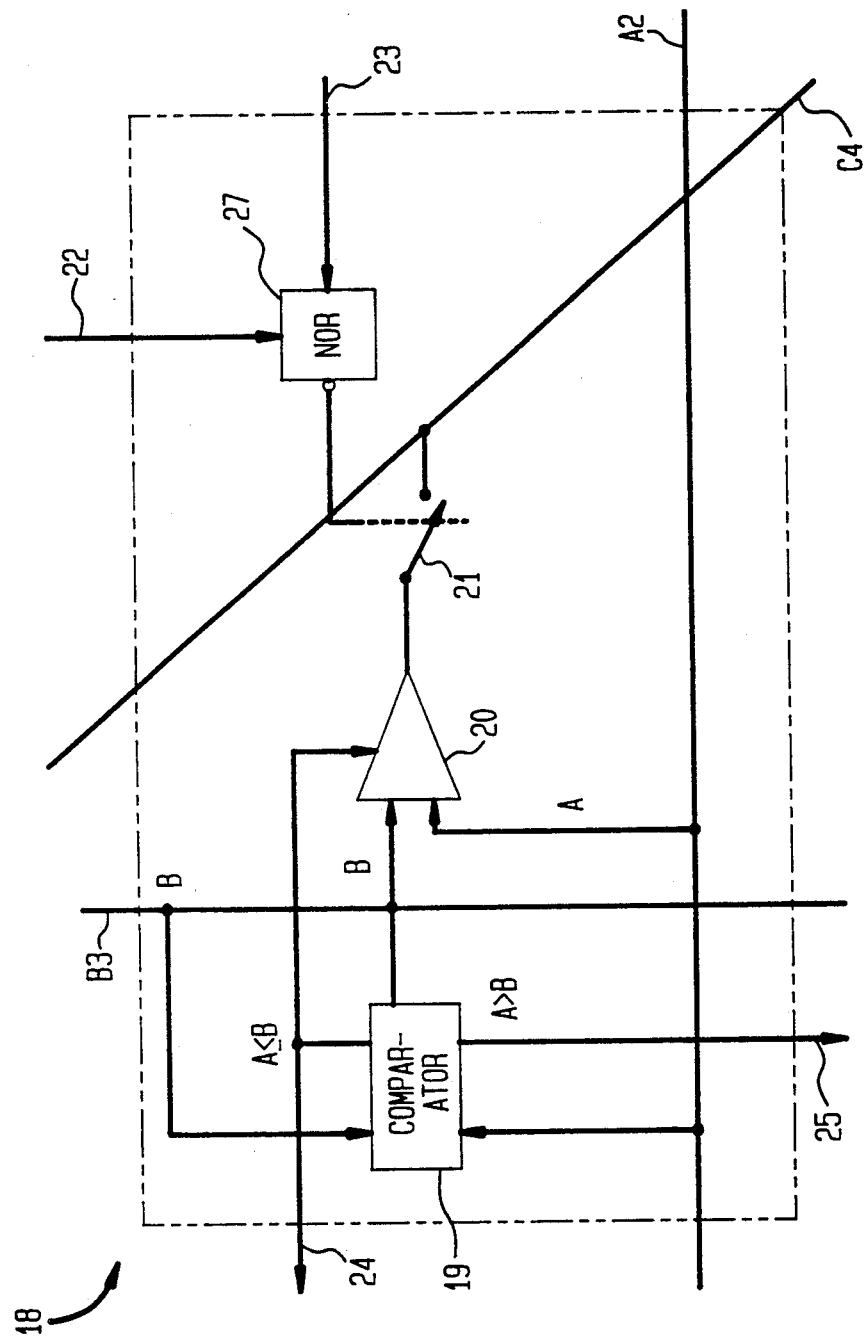
FIG. 5 is a block-schematic of the cell identified in FIG. 4.

The circuit and orientation of the sorting cells will now be described with reference to FIGS. 4 and 5.

The organization of cells (such as 18) in the upper right triangular half of the matrix 15a is a mirror image, about the line between the diagonal C8 and C9, of the cells in the lower left triangular half of the matrix 15a. All of the cells are identical to the cell 18 shown in FIG. 5.

The cell 18 has inputs from input buses A2 and B3. The cell 18 comprises a comparator 19 which compares the analog or the digitally encoded magnitude of the signals input on A2 and B3, a selector 20 and a switch 21 to connect the selected signal to the diagonal output bus C4.

Many cells are potentially connectable to an output diagonal bus C1 to C16 and so could be in conflict. Therefore, the cell 18 further comprises two inhibit inputs 22 and 23 and two inhibit outputs 24 and 25. The two inhibit inputs 22 and 23 and the two inhibit outputs 24 and 25 are connected vertically and horizontally between adjacent cells such that the flow of control is in the direction of the output diagonals C8 and C9 (the main diagonals).

The cells around the perimeter of the matrix are not ordinary cells like the cell 18, even though they are identical in structure for reasons of economy. They do not receive inhibit inputs from outside the matrix. Similarly, the cells 26 and 26' along the diagonals C8 and C9, respectively, do not generate inhibit outputs such that inhibit control does not cross from the diagonal C8 to C9 or vice versa.

The cell 18 independently compares the input received at the buses A2 and B3 and makes a selection as between them by means of the selector 20. The selection is switched to the bus C4 only if NOR gate 27 indicates both inhibit inputs 22 and 23 are OFF, as per the following truth table:

| Inhibit Input 21 | Inhibit Input 23 | NOR Gate 27 |
|---|---|---|
| 0 | 0 | 1 |
| 0 | 1 | 0 |
| 1 | 0 | 0 |
| 1 | 1 | 0 |

This, of course, ensures that the diagonal C4 does not receive multiple signals at the same time.

At the same time, and totally independently of the inhibit inputs 22 and 23, the cell 18 turns one of its inhibit outputs 24 and 25 ON. Specifically, the horizontal output 24 is turned ON if the signal from bus A2 is selected (in FIG. 5, for example, if A>B) and the vertical output 25 is turned ON if bus B3 is selected (in FIG. 5, for example, if A<B).

Thus the cell 18 selects a bus and inhibits a neighboring cell simultaneously. Such selection and inhibition has the important consequence that no ripple through delay is required. Since selection and inhibit mechanisms operate in parallel, the network is very fast, requiring on the order of ($\log_2 N$) cell delays (with N=32 for the network 10), where a cell delay is made up of delay from the comparator 19 and the selector 20.

The sense of sorting may be selected arbitrarily, to be ascending or descending, but all cells must operate in the same sense in the upper triangle, and the opposite sense in the lower triangle of the matrix 15a.

In the case of equality of the signals input at the respective inputs A2 and B3 for the cell 18, either signal (it does not matter which) may be selected and the corresponding inhibit output is generated. But generally speaking, it should be noted that the selection criteria may be different from simply comparing magnitude. For example, for digitally packetized signals, certain priority encoding portions may be compared and a decision made accordingly to select either signal A or signal B.

Preferably, the network 10 further comprises drivers or buffers (not shown) between the stages, at least for longer signal paths in the last stage of the sorting network. In the input stages, the busses are very short, such as fanouts of 2, 3, 5 or 9, and the busses may be joined by simple switches.

The network 10 of the present invention requires all data to be available for the comparisons before the correct inhibit decisions can be made. This is naturally the case where the data is propagated in analog or in parallel digital form. Serial digital transmission on the busses A, B, C and/or between the stages is possible if conversion to parallel takes place in each cell or between stages.

Serial transmission on the busses A, B, C, combined with serial (1-bit) comparison circuits in the cells considerably reduces the amount of hardware required, potentially allowing large sorting matrices to be built on a single device, but at the expense of added delay. The extra delay is dependent on the word length to be compared.

The pattern of the sorting network 10 is fundamentally two-dimensional, conceptually consisting as it does of only horizontal busses, vertical busses, and one direction of diagonal busses. Clock and power buses blend in right along with these busses. The linear layout also means that growth, while ultimately limited by cost, is not difficult topologically. A plane may simply be covered with cells and the three busses A, B and C interrupted and spliced together.

In the matrix sorter of the present invention slices of network 10 along either edge between one input or set of inputs and the corresponding outputs can be removed without affecting the operation of the rest of the network 10. This feature may be useful for testing and fault diagnostic purposes in that the size of a fully configured network 10 can be dynamically reduced.

What is claimed is:

1. A matrix sorting network for sorting N inputs onto N outputs wherein N is an integer of the power of 2, said matrix comprising:
   $\log_2 N$ stages;
   each said stage comprising M matrices, where M is an integer such that $M=(N/2^L)$ for the Lth stage of said matrix sorting network;

each said matrix of each said stage including an (N/2M)-by-((N/2M)+1) array of sorting cells including N/2M rows of said cells and N/2M+1 columns of said cells wherein said cells of each said matrix define one or more diagonals;

N/2M first input buses extending along said rows of each said matrix and N/2M second input buses extending along said columns of each said matrix;

each said sorting cell having a first cell input means for carrying an input signal having a value and connected to one of said first input buses, a second cell input means for carrying an input signal having a value and connected to one of said second input buses, a comparator for selecting either the said value carried on said first cell input means or the value carried on said second input means by comparing values to one another, and one cell output means carrying a cell output signal of value equal to the selected one of said values;

output buses such that each output bus is connected to the output means of the cells disposed at one diagonal and such that each output bus may receive the cell output signal of connected sorting cells;

at least one of said sorting cells further comprising an inhibit output means for providing a disabling signal having a value dependent upon which one of said values carried on the cell input means of such cell is selected by the comparator of such said cell; and at least one of said sorting cells further comprising a disabling means connected to the inhibit output means of at least one other cell and for preventing the cell output signal of such cell from being conveyed to any of said output buses dependent upon the value of the disabling signal.

2. A matrix sorting network as claimed in claim 1 wherein each said disabling means comprises a first inhibit input means for accepting a disabling signal from the inhibit output means of one other cell, and a second inhibit input means for accepting a disabling signal from the inhibit output means of a second other cell.

3. A matrix sorting network as claimed in claim 2 wherein each said inhibit output means includes two inhibit output connections, and means for providing different disabling signals at said two inhibit output connections.

4. A matrix sorting network as claimed in claim 1 wherein said array of cells of at least one said matrix define a main diagonal bisecting the array, said disabling means and said inhibit output means in each such matrix being connected to one another so that said disabling means of said cells in such matrix closer to the main diagonal are connected to the inhibit output means of cells farther from said main diagonal.

5. A matrix sorting network as claimed in claim 4 wherein said comparators of said array of cells of each said matrix are arranged such that said comparators on one side of said main diagonal select the greater of the values carried on said cell input means, and said comparators on the other side of said main diagonal select the lesser of the values carried on said cell input means.

6. A matrix sorting network as claimed in claim 5 wherein each said cell having inhibit output means further comprises one row inhibit output means and one column inhibit output means, such that said row inhibit output means are connected to said disabling means of the adjacent cell close to said main diagonal and in the same row as said cell having said inhibit output means, and said column inhibit output means are connected to said disabling means of the adjacent cell close to said main diagonal and in the same column as said cell having said inhibit output means.

7. A matrix sorting network as claimed in claim 1 wherein each said output bus within one said stage of said matrix sorting network is connected to one said input bus of one said matrix within the next said stage, for all said stages of said matrix sorting network except for the last said stage.

* * * * *